US012404154B2

(12) United States Patent
Honjo et al.

(10) Patent No.: US 12,404,154 B2
(45) Date of Patent: Sep. 2, 2025

(54) WORK MACHINE AND MOBILE CRANE

(71) Applicant: SUMITOMO HEAVY INDUSTRIES CONSTRUCTION CRANES CO., LTD., Tokyo (JP)

(72) Inventors: Kohei Honjo, Aichi (JP); Tatsuya Matsushita, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 372 days.

(21) Appl. No.: 17/951,890

(22) Filed: Sep. 23, 2022

(65) Prior Publication Data

US 2023/0018143 A1 Jan. 19, 2023

Related U.S. Application Data

(63) Continuation of application No. PCT/JP2021/012987, filed on Mar. 26, 2021.

(30) Foreign Application Priority Data

Mar. 27, 2020 (JP) ................................ 2020-057213

(51) Int. Cl.
*B66C 23/74* (2006.01)
*B66C 13/00* (2006.01)
(Continued)

(52) U.S. Cl.
CPC .............. *B66C 23/74* (2013.01); *B66C 13/00* (2013.01); *B66C 23/88* (2013.01); *B66C 23/36* (2013.01); *B66C 2700/0371* (2013.01)

(58) Field of Classification Search
CPC ......... B66C 23/72; B66C 23/74; B66C 23/76; E02F 9/18; B62D 49/085
See application file for complete search history.

(56) References Cited

U.S. PATENT DOCUMENTS 5,524,777 A * 6/1996 Weber .................... B66C 23/74 212/178
10,717,631 B2 7/2020 Rudy et al.
(Continued)

FOREIGN PATENT DOCUMENTS

CN 106144924 A 11/2016
JP H07-117989 A 5/1995
(Continued)

OTHER PUBLICATIONS

International Search Report issued in Application No. PCT/JP2021/012987, mailed Jun. 22, 2021.
(Continued)

*Primary Examiner* — Anna M Momper
*Assistant Examiner* — Juan J Campos, Jr.
(74) *Attorney, Agent, or Firm* — Michael Best & Friedrich LLP

(57) ABSTRACT

The work machine includes a work machine body, and an assembly component that is attached to the work machine body. The work machine further includes a detection unit that monitors surroundings. The work machine body includes a lower traveling body and a rotating platform that rotates relative to the lower traveling body. The detection unit is attached to the rotating platform without interposing the assembly component.

10 Claims, 7 Drawing Sheets

(51) Int. Cl.

| | |
|---|---|
| ***B66C 23/88*** | (2006.01) |
| *B66C 23/36* | (2006.01) |

(56) References Cited

U.S. PATENT DOCUMENTS

| | | | | |
|---|---|---|---|---|
| 10,829,347 | B2 | 11/2020 | Rudy et al. | |
| 10,919,584 | B2 | 2/2021 | Takahashi et al. | |
| 11,124,392 | B2 | 9/2021 | Rudy et al. | |
| 11,130,658 | B2 | 9/2021 | Rudy et al. | |
| 2011/0031202 | A1 | 2/2011 | Pech et al. | |
| 2013/0098860 | A1 | 4/2013 | Pech et al. | |
| 2013/0112642 | A1 | 5/2013 | Pech et al. | |
| 2018/0141787 | A1* | 5/2018 | Rudy | B66C 15/06 |
| 2018/0143011 | A1* | 5/2018 | Rudy | G06T 7/70 |
| 2018/0338087 | A1* | 11/2018 | Oblak | G06F 3/04883 |
| 2020/0062558 | A1 | 2/2020 | Pech et al. | |
| 2022/0119232 | A1 | 4/2022 | Pech et al. | |

FOREIGN PATENT DOCUMENTS

| | | | |
|---|---|---|---|
| JP | H9-158258 | A | 6/1997 |
| JP | 2000-191273 | A | 7/2000 |
| JP | 2002-128463 | A | 5/2002 |
| JP | 2002-371595 | A | 12/2002 |
| JP | 2006-037606 | A | 2/2006 |
| JP | 2010-189869 | A | 9/2010 |
| JP | 2013-204411 | A | 10/2013 |
| JP | 2018-093501 | A | 6/2018 |
| JP | 2018-127357 | A | 8/2018 |
| JP | 2019-014585 | A | 1/2019 |
| JP | 2019-075712 | A | 5/2019 |

OTHER PUBLICATIONS

Chinese Office Action dated Oct. 18, 2024 for the corresponding Chinese Application No. 202180023889.3.

* cited by examiner

WORK MACHINE AND MOBILE CRANE

RELATED APPLICATIONS

The contents of Japanese Patent Application No. 2020-057213, and of International Patent Application No. PCT/JP2021/012987, on the basis of each of which priority benefits are claimed in an accompanying application data sheet, are in their entirety incorporated herein by reference.

BACKGROUND

Technical Field

Certain embodiments of the present invention relate to a work machine and a mobile crane.

Description of Related Art

The related art discloses a surrounding monitoring device for an excavator, which is a work machine. The surrounding monitoring device includes a camera and a distance image sensor attached at an upper rear end of a counterweight of the excavator.

SUMMARY

According to an embodiment of the present invention, there is provided a work machine that is assembled or disassembled, the work machine including:

a work machine body; and an assembly component that is attached to the work machine body, the work machine further including:

a detection unit that monitors surroundings, in which the work machine body includes a lower traveling body and a rotating platform that rotates relative to the lower traveling body, and the detection unit is attached to the rotating platform without interposing the assembly component.

According to another embodiment of the present invention, there is provided a mobile crane that is assembled or disassembled at a work site, the mobile crane including:

a crane body; and a counterweight that includes weights in a plurality of stages and that is attached to the crane body, in which a setting is capable of being changed to any one of a plurality of lifting capacities by changing the number of stages of the weights attached to the crane body, and the plurality of lifting capacities includes a first lifting capacity and a second lifting capacity that is a lower lifting capacity than the first lifting capacity, the mobile crane further including:

a detection unit that monitors surroundings attached to the counterweight, in which the detection unit is attached below an uppermost stage of the weight attached when the second lifting capacity is set.

DETAILED DESCRIPTION

A work machine such as a crawler crane is assembled at a work site, and when the work is completed, the work machine is disassembled at the work site and carried out. Moreover, there is an assembly component that may or may not be attached at each site. In the case of the work machine that is assembled or disassembled in this way, it is necessary to change the position of a surrounding monitoring device depending on the mounting situation of the assembly component, and there is a need in that it is difficult to realize uniform monitoring processing is difficult.

It is desirable to provide a work machine and a mobile crane that are assembled or disassembled and that can realize monitoring processing that is less dependent on the mounting situation of an assembly component.

According to the present invention, in the work machine and the mobile crane that are assembled or disassembled at a work site, surrounding monitoring can be performed even during assembly or disassembly without the need to move a surrounding monitoring device.

Hereinafter, respective embodiments of the present invention will be described in detail with reference to the drawings.

Embodiment 1

Figure 1:
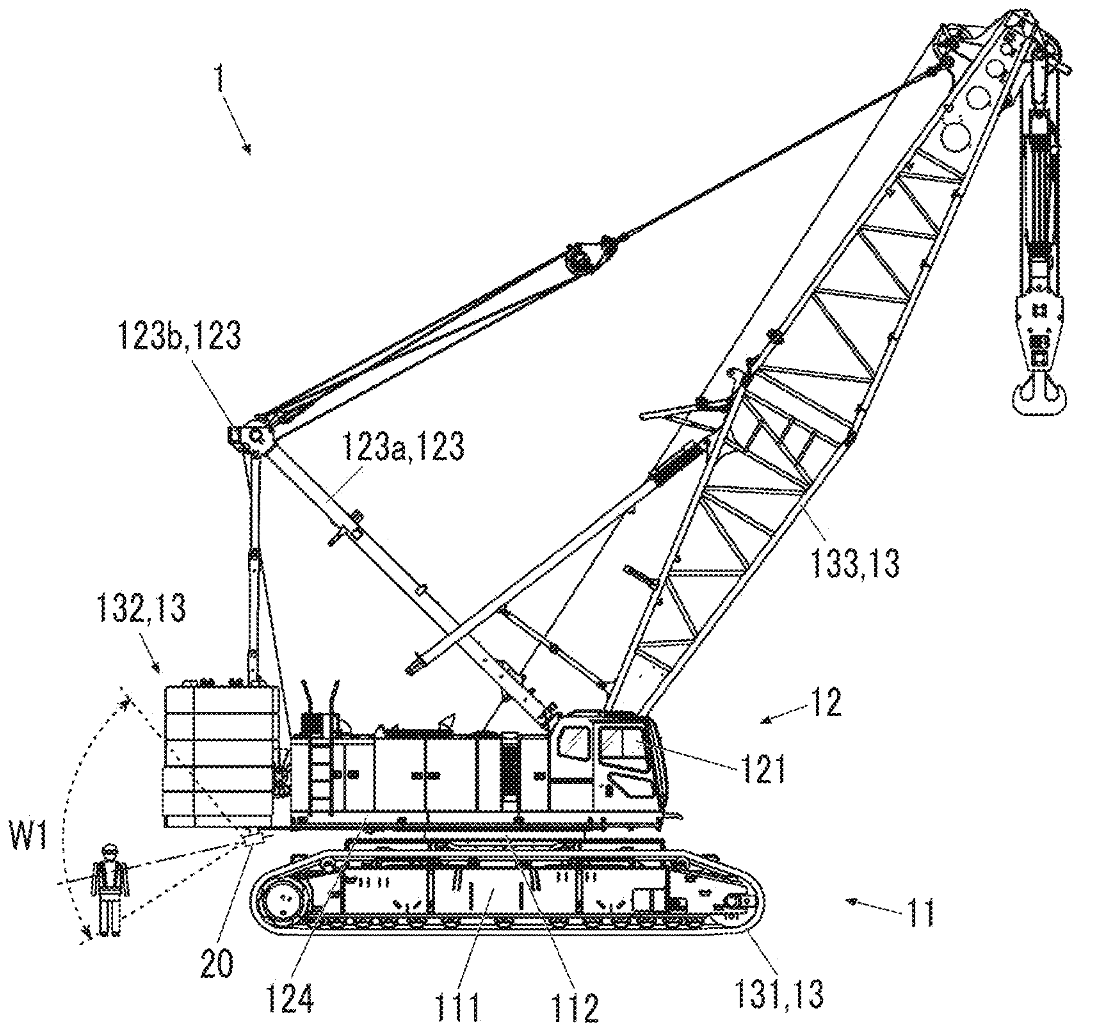
FIG. 1 is a side view showing a work machine according to Embodiment 1 of the present invention.
Figure 2:
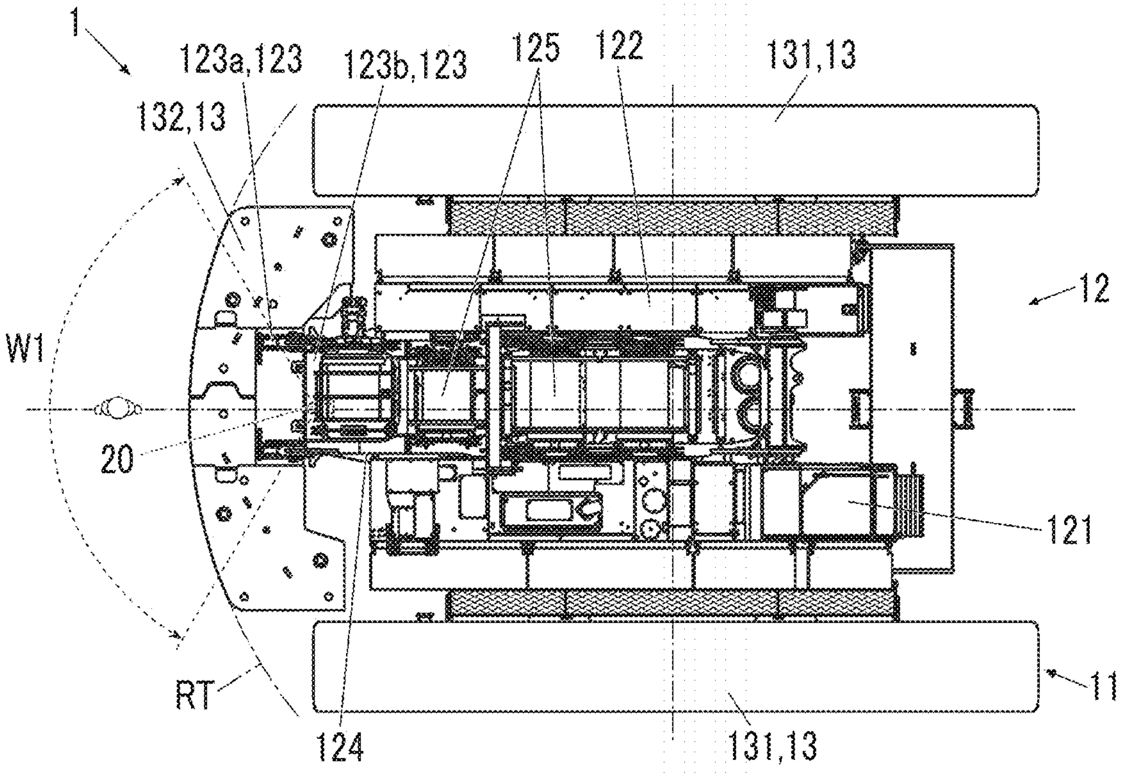
FIG. 2 is a plan view of the work machine illustrating the disposition of a detection unit.
Figure 3:
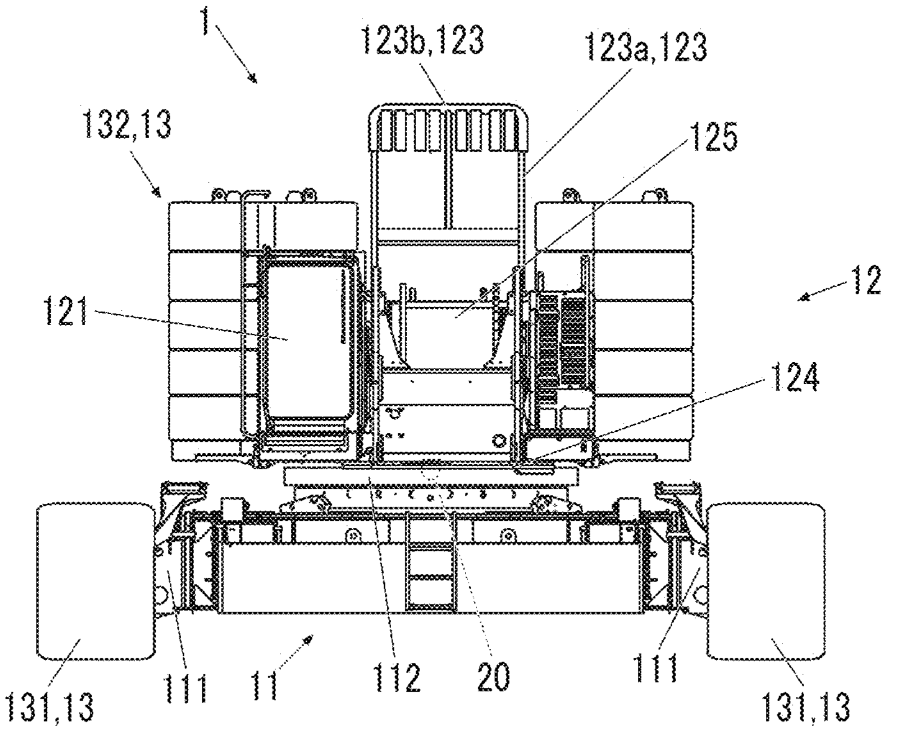
FIG. 3 is a front view of the work machine illustrating the disposition of the detection unit.
Figure 4:
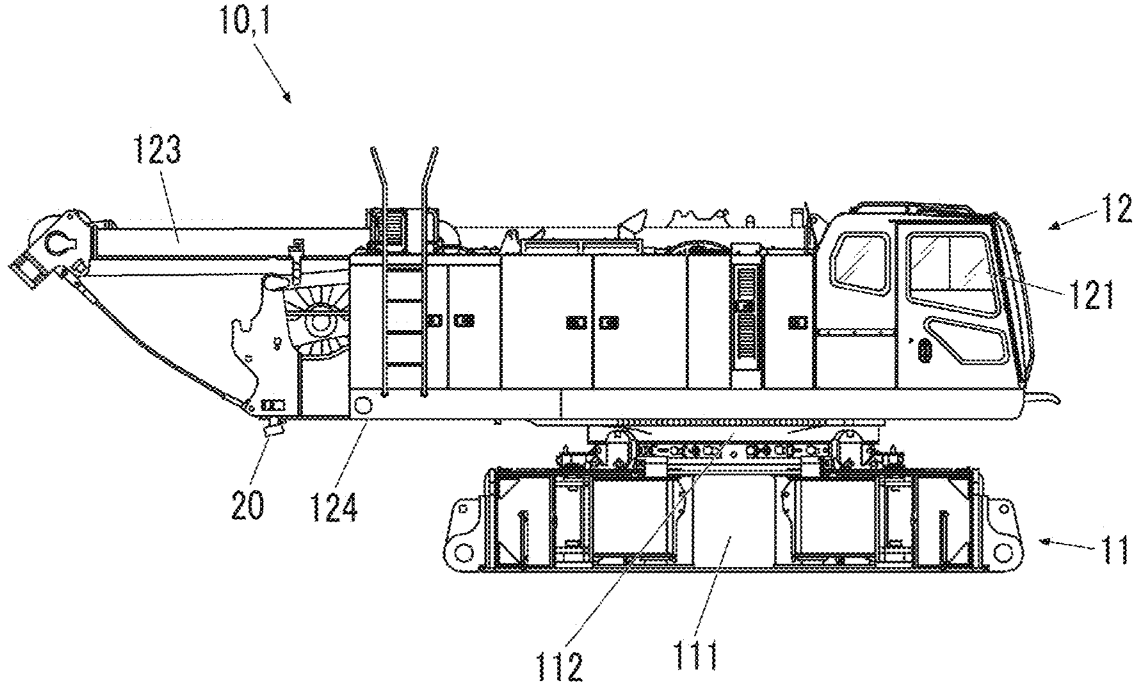
FIG. 4 is a view showing a configuration of the work machine of FIG. 1 with an assembly component removed.

FIG. 1 is a side view showing a work machine according to Embodiment 1 of the present invention. FIG. 2 is a plan view of the work machine illustrating the disposition of a detection unit. FIG. 3 is a front view of the work machine illustrating the disposition of the detection unit. FIGS. 2 and 3 show a state in which a boom 133 is removed. FIG. 4 is a view showing a configuration of the work machine of FIG. 1 with an assembly component removed. Hereinafter, a description will be made with a direction along a pivot axis of the boom 133 as a left-right direction, and out of directions perpendicular and horizontal to the pivot axis of the boom 133, a cab 121 side from a turning center of the rotating platform 12 is described as a front side and a counterweight 132 side is described as a rear side.

A work machine 1 according to Embodiment 1 is a machine that is assembled and used at a work site, or disassembled and transported from the work site. The work machine 1 is a mobile crane, specifically a crawler crane. In addition, the assembly or disassembly may be performed at a place for assembly around a place other than where lifting work or the like is actually performed. For example, the work machine 1 may be assembled halfway up a mountain, and the assembled work machine 1 may travel and move to a work place. In this case, the assembly place is halfway up the mountain.

The work machine 1 includes a work machine body (crane body) 10 (see FIG. 4), an assembly component 13 that is lifted by a heavy machine and that is attached to the work machine body 10, and a detection unit 20 that monitors the surroundings. The work machine body 10 in FIG. 4 shows a state in which the assembly component 13 is not attached. The work machine 1 may further include a monitoring device that receives a detection signal from the detection unit 20 and that monitors the surroundings. The monitoring device may include a display unit that outputs a monitoring image including surrounding workers, pedestrians, or obstacles detected by the detection unit 20. The display unit may be disposed in a cab of the work machine 1, a management terminal at the work site, a management center away from the site, or the like.

The work machine body 10 includes a lower traveling body 11 to which a crawler component 131 is assembled to constitute a crawler, and a rotating platform 12 that rotates relative to the lower traveling body 11. The rotating platform 12 includes a cab 121, a winch 125, a hydraulic device 122, a mast 123, a main frame 124, a lower frame 111, which is a support base for the lower traveling body 11, and the like. The main frame 124 is a member that supports any one of the boom, the hydraulic device, the winch, or the mast from below. Specifically, the main frame 124 is a frame that supports each component of the rotating platform 12 and to which the boom is pivotably connected, is connected to the lower traveling body 11 via a turning bearing, and extends from the cab 121 to a halfway spot of the counterweight 132 in a front-rear direction. The main frame 124 may be configured so that the main frame 124 can be divided and assembled into a plurality of frames such as a front frame and a back frame. Even in this case, the front frame and the back frame are included in the work machine body 10 and are not included in the assembly component 13. The work machine body 10 has a jack (not shown) for raising itself. The mast 123 is configured to apply a rearward load to the boom 133. When the work machine 1 is assembled or disassembled, a hook is hung from a tip of the mast 123, the assembly component 13 is lifted and lowered by the hook and the rotating platform 12 is turned, so that the assembly component 13 lifted by the mast 123 can be moved. The mast 123 is a concept that includes an A-frame that does not oscillate during crane work.

The assembly component 13 is a part that is mainly assembled at a work site, and means a heavy part that is attachable to the work machine body 10 by being lifted by the heavy machine or the like. Therefore, parts such as a lightweight ladder that can be raised and attached only by human power, parts such as a lightweight stay, and a bracket for attaching a camera are excluded from the assembly component 13. That is, in the present specification, the "assembly component" is defined as a part that cannot be assembled by human power alone. A part that cannot be assembled by human power alone is a part that needs to be lifted by the heavy machine or the like defined in each site or assembly manual, and is, for example, a part larger than 20 kg.

The assembly component 13 includes the crawler component 131, the counterweight 132, the boom 133, a lower weight (not shown), and the like. The crawler component 131 may include a part of a crawler drive mechanism in addition to crawler shoes. The assembly component 13 is connected to the work machine body 10 by pin joints, cylinder fastening, or bolt fastening.

The assembly component 13 is attached at the work site as follows. For example, the crawler component 131 is lifted using another crane or the mast 123 and is moved to the lower frame 111 of the lower traveling body 11 in a state in which the work machine body 10 is raised by the jack. In this state, the worker connects the crawler component 131 to the lower frame of the lower traveling body 11. The counterweight 132 is lifted using another crane or the mast 123, moved to a rear portion of the main frame 124, and attached to a relevant spot. The boom 133 and the lower weights 134 are also lifted using another crane or the mast 123, moved to an attachment spot of the main frame 124, and attached to the relevant spot.

Figure 5A:
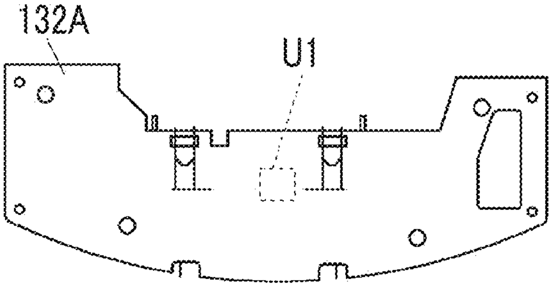
FIG. 5A is a view showing a counterweight and a plan view of a base weight.
Figure 5B:
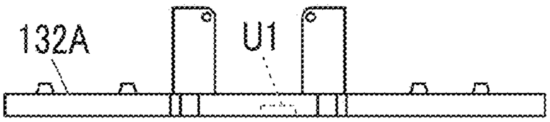
FIG. 5B is a view showing the counterweight and a rear view of the base weight.
Figure 5C:
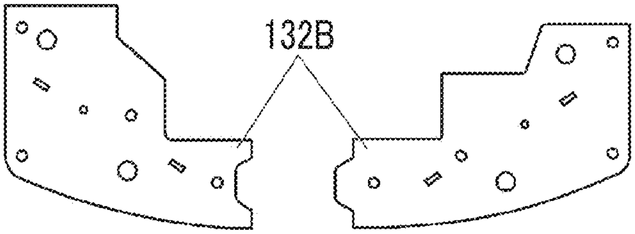
FIG. 5C is a view showing the counterweight and a plan view of a first weight.
Figure 5D:
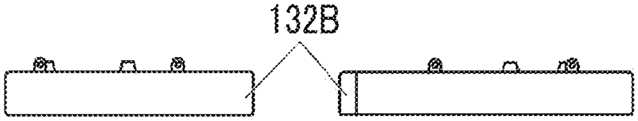
FIG. 5D is a view showing the counterweight and a rear view of the first weight.
Figure 5E:
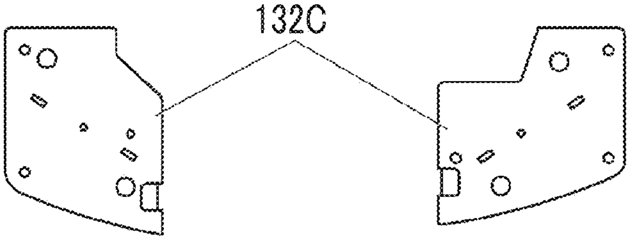
FIG. 5E is a view showing the counterweight and a plan view of a second weight.
Figure 5F:
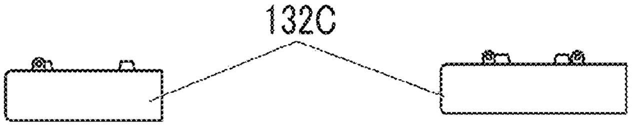
FIG. 5F is a view showing the counterweight and a rear view of the second weight.

FIGS. 5A to 5F are views showing the counterweight, FIGS. 5A, 5C, and 5E show plan views of a base weight, a first weight, and a second weight, respectively, and FIGS. 5B, 5D, and 5F show rear views of the base weight, the first weight, and the second weight, respectively. The counterweight 132 includes a base weight 132A attached to the main frame of the rotating platform 12, and a first weight 132B and a second weight 132C attached to the rotating platform 12 via the base weight 132A. The base weight 132A is configured to be attachable only in one stage, and the first weight 132B and the second weight 132C of the same form are configured to be stacked in a plurality of stages and be attachable. The counterweight 132 may be configured such that other weights such as the first weight 132B and the second weight 132C are stacked above the base weight 132A or other weights are suspended below the base weight 132A.

The detection unit 20 is a device that acquires data for detecting objects present in the surroundings, such as a range finder such as a scanning type light detection and ranging (LiDAR) device or an imaging camera. The detection unit 20 has a detection range W1 shown in FIGS. 1 and 3 and detects an object present within the detection range W1. The detection range W1 extends in an angle range centered on a vertical axis and an angle range centered on an axis extending to the left and right. In a case where the detection unit 20 is a LiDAR device, the detection unit 20 can acquire data indicating the direction and distance of an object located in the detection range and detect where the object is present in the surroundings from the data. In a case where the detection unit 20 is an imaging camera, the detection unit 20 can detect objects such as workers, pedestrians, and obstacles within the detection range W1 by performing image recognition from the captured image in the detection range W1.

As shown in FIG. 1, the detection unit 20 of the monitoring device is attached to the rotating platform 12 without interposing the assembly component 13. More specifically, the detection unit 20 is attached to a lower surface of the main frame 124 via a stay or the like and is disposed at a lower portion of the main frame 124 or below the main frame 124. In addition, the main frame 124 may have a recessed portion at a lower portion thereof, and the detection unit 20 may be disposed in the recessed portion and be positioned above a bottom end of the main frame 124.

Moreover, the detection unit 20 is attached to a main body of the rotating platform 12 that is first attached to the lower traveling body 11. However, the attachment of the main body of the rotating platform 12 to the lower traveling body 11 is not performed on site or in its vicinity. The above main body that is first attached to the lower traveling body 11 is, for example, the main frame 124. Moreover, the detection unit 20 is disposed behind a turning bearing 112 of the rotating platform 12. In addition, the detection unit 20 is disposed at a position overlapping the mast 123 when viewed vertically from above. The mast 123 has two struts 123*a*, and a horizontal member 123*b* that connects the two struts to each other. The position overlapping the mast 123 when viewed from above may be a position overlapping the strut 123*a* or the horizontal member 123*b* when the mast 123 is at any angle from a horizontal angle to a vertical angle. The position where the mast 123 overlaps corresponds approximately to a center range in the left-right direction behind the center of the rotating platform 12.

Moreover, the detection unit 20 is disposed inside a turning radius RT (see FIG. 2) of the rotating platform 12. The turning radius RT means the trajectory of an end portion of a component that moves on the outermost side when the rotating platform 12 has turned, except for displaceable configurations such as the boom 133 and the mast 123. In a general crane, the turning radius corresponds to a rear end radius, and corresponds to the trajectory of a rear end portion of the counterweight 132 in a case where the counterweight 132 is attached.

As shown in FIGS. 1 and 3, the detection range W1 of the detection unit 20 extends rearward, leftward, rightward, upward, and downward. The detection range W1 overlaps a part of the counterweight 132, more specifically, overlaps a lower rear end portion of the counterweight 132. Therefore, the detection unit 20 can directly detect a portion that forms a turning radius (rear end radius) R1 of the rotating platform 12.

Figure 6A:
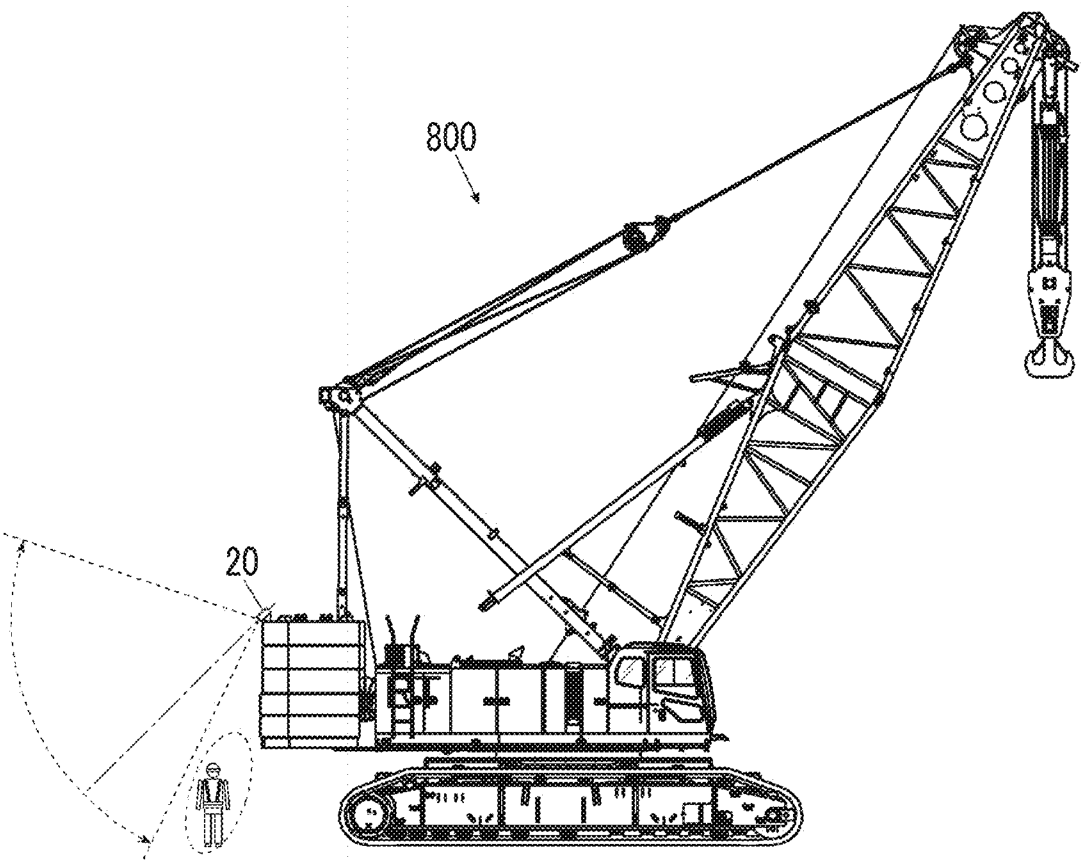
FIG. 6A is a side view showing a work machine of a comparative example.
Figure 6B:
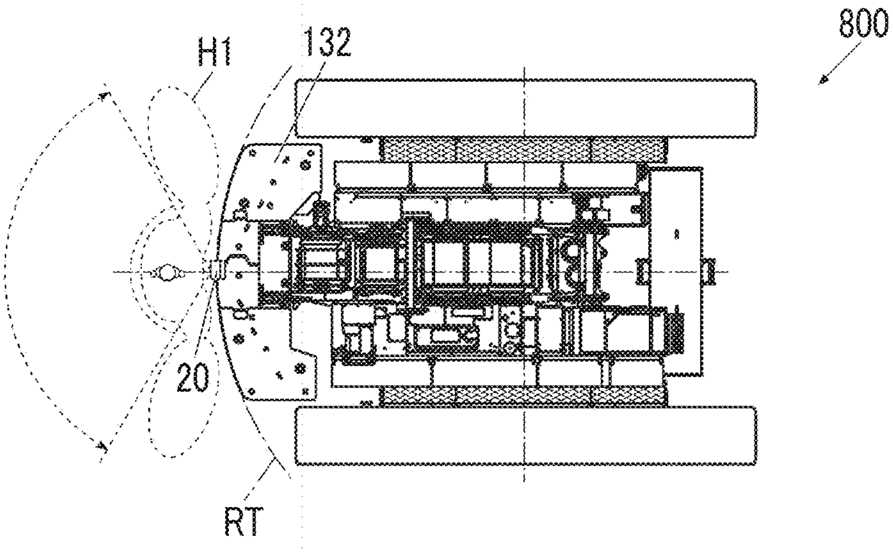
FIG. 6B is a plan view showing the work machine of the comparative example.

FIG. 6A is a side view showing a work machine of a comparative example. FIG. 6B is a plan view showing the work machine of the comparative example. In a case where the detection unit 20 is disposed above an upper rear end portion of the counterweight 132 as in a work machine 800 of the comparative example, unless the detection unit 20 is moved to another place before the counterweight 132 is attached, that is, when the work machine 800 is assembled or disassembled, there is a problem that surrounding monitoring cannot be performed. Moreover, since simply moving the detection unit 20 to another position lowers the accuracy of the position and angle of the detection unit 20, a problem occurs in that favorable surrounding monitoring is difficult.

Additionally, general mobile cranes are configured such that a desired lifting capacity can be selected from a plurality of levels of lifting capacity. The lifting capacity is switched by the number of attachment stages of the counterweights 132. The number of attachment stages of the counterweights 132 is detected by a weight detection device and notification is sent to the control unit of the work machine, and on the basis of this notification, the control unit sets the lifting capacity and determines various control parameters. When the detection unit 20 is disposed above the upper rear end portion of the counterweight 132, and when the lifting capacity has been changed, the number of stages of the counterweights 132 changes, and the height of the detection unit 20 changes. When the position of the detection unit 20 is constant, uniform monitoring processing is possible on the basis of the output of the detection unit 20. However, when the position of the detection unit 20 is not constant, it is necessary to prepare a plurality of kinds of setting data or programs for monitoring processing respectively adapted to a plurality of positions where the detection unit 20 is disposed. When the same monitoring processing is performed using one set data or program even when the position of the detection unit 20 changes, it is difficult to perform the monitoring processing that matches a difference in height.

Additionally, in recent mobile cranes, in order to reduce the size of the crane body portion and to improve the lifting capacity, the weight of the counterweight 132 is increased, and to that effect, the height of the counterweight 132 is often increased. When the detection unit 20 is disposed above the upper rear end portion of the counterweight 132 having an increased height, a blind spot H1 occurs near the turning radius RT as shown in FIGS. 6A and 6B.

Moreover, a fallen mast 123 may approach an upper portion of the counterweight 132. When the detection unit 20 is disposed in the center such that a single detection unit 20 can monitor a region that extends to the left and right, a risk occurs that the detection unit 20 and the mast 123 interfere with each other.

However, according to the work machine 1 of Embodiment 1, the detection unit 20 for the surrounding monitoring is attached to the rotating platform 12 without interposing the assembly component 13 that is lifted and attached by the heavy machine. Therefore, when the assembly component 13 is attached or detached, the surrounding monitoring can be performed using the detection unit 20 disposed at a predetermined position without changing the attachment position of the detection unit 20. When the assembly component 13 is lifted using the mast 123 and the rotating platform 12 is turned to move the assembly component 13, the surrounding monitoring can be performed on the basis of the detection of the detection unit 20 similar to that during normal work. Since the detection unit 20 is attached to the rotating platform 12, it is easy to monitor whether or not there is an abnormality in the surroundings when the rotating platform 12 turns. Since the detection unit 20 is not connected via the assembly component 13, a situation does not occur in which an error occurs in the position and angle of the detection unit 20 depending on the attachment state of the assembly component 13, and uniform surrounding monitoring that does not depend on the attachment state can be realized.

Moreover, according to the work machine 1 of Embodiment 1, the detection unit 20 is disposed on a lower surface of the main frame 124 or below the lower surface. Therefore, blind spots are less likely to occur behind the work machine 1, and it is possible to detect objects (workers, obstacles, or the like) that pass relatively below the counterweight 132 when the rotating platform 12 turns. In a case where the height of an object is low, when the rotating platform 12 turns, the object interferes with the rotating platform 12 or the rotating platform 12 (counterweight 132) passes above the object. Accordingly, a determination as to whether or not the object interferes with the rotating platform 12 can be performed on the basis of the detection result of the detection unit 20.

Moreover, according to the work machine 1 of Embodiment 1, the detection unit 20 is disposed so as to overlap the mast 123 when viewed vertically from above. Therefore, a single detection unit 20 can detect a region that extends to the left and right. Moreover, even when the detection unit 20 is at a position overlapping the mast 123, since the detection unit 20 is attached to the lower portion of the main frame 124, there is no risk of interference between the mast 123 and the detection unit 20.

Moreover, according to the work machine 1 of Embodiment 1, the detection unit 20 is disposed inside the turning radius RT. Therefore, on the basis of the detection result of the detection unit 20, whether or not there is an abnormality from the inside of the turning radius RT to the vicinity and outside of the turning radius RT can be monitored. Moreover, according to the work machine 1 of Embodiment 1, since the counterweight 132 overlaps the detection range W1 of the detection unit 20, the turning radius RT, that is, the rear end portion of the rotating platform 12 can be directly detected when the rotating platform 12 turns. Therefore, whether or not there is an abnormality in the vicinity of the turning radius RT can be monitored with higher accuracy.

Embodiment 2

Figure 7:
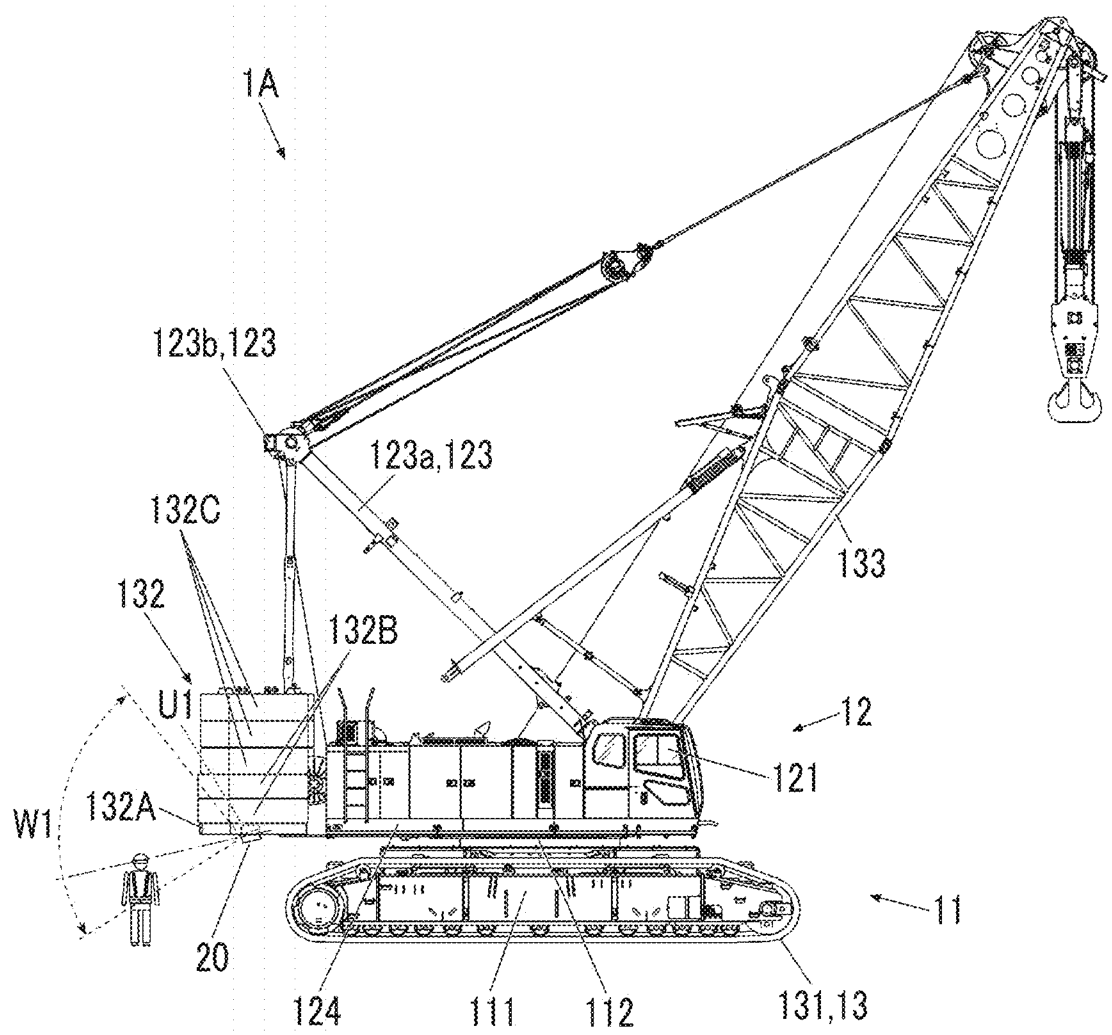
FIG. 7 is a side view showing a state in which a work machine according to Embodiment 2 of the present invention is set to have a first lifting capacity.
Figure 8:
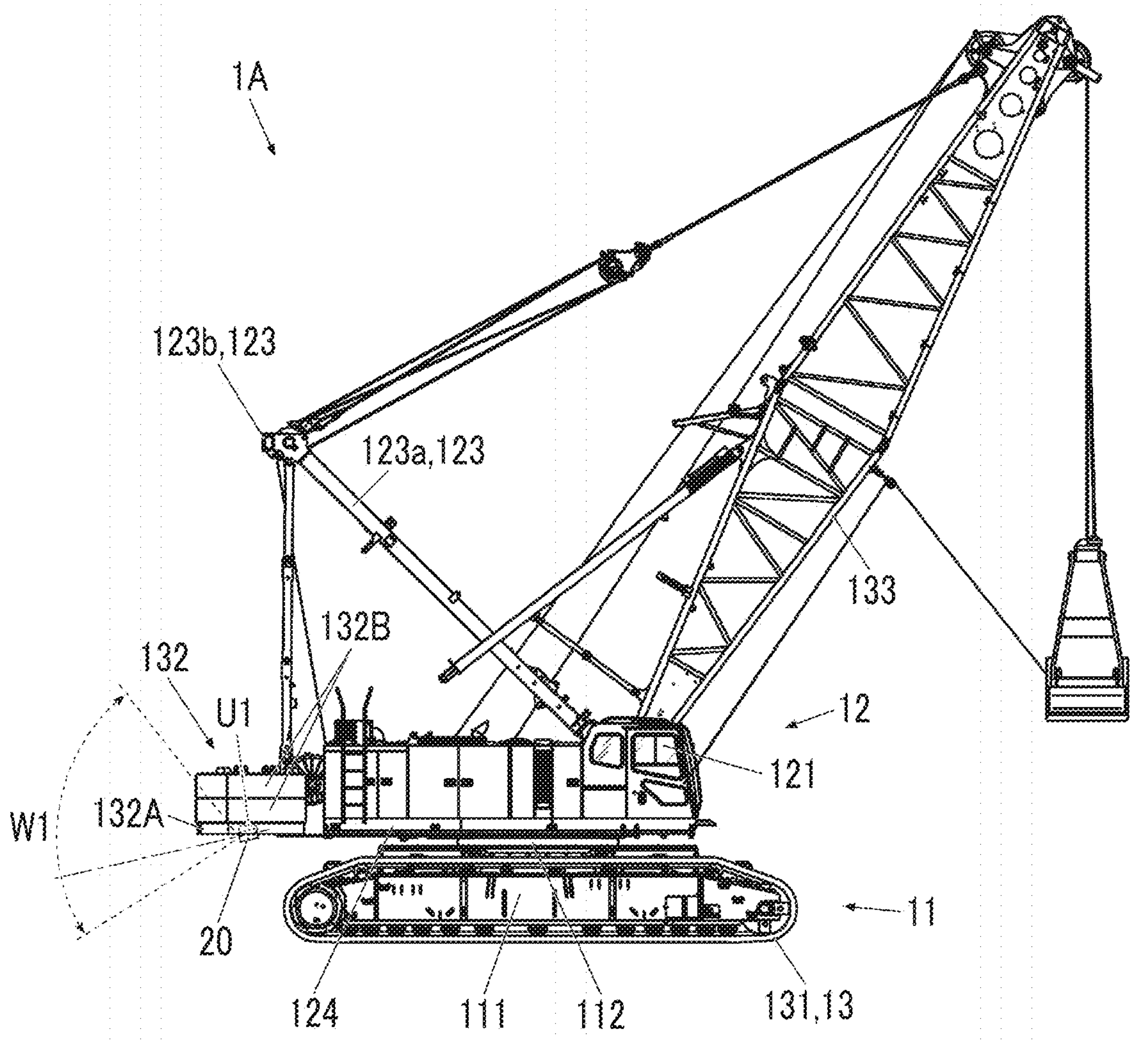
FIG. 8 is a side view showing a state in which the work machine according to Embodiment 2 is set to have a second lifting capacity lower than the first lifting capacity.

FIG. 7 is a side view showing a work machine according to Embodiment 2 of the present invention when a first lifting capacity is set. FIG. 8 is a side view showing the work machine according to Embodiment 2 when a second lifting capacity lower than the first lifting capacity is set. A work machine 1A according to Embodiment 2 is configured similar to the work machine 1 according to Embodiment 1 except that the attachment position of the detection unit 20 for the surrounding monitoring is different.

In Embodiment 2, the detection unit 20 is attached to a weight below the counterweight 132 in the uppermost stage mounted on the work machine body 10 when the second lifting capacity (for example, the lowest lifting capacity) lower than the first lifting capacity is set. In an example of FIGS. 7 and 8, the counterweights 132 mounted at the second lifting capacity are the base weight 132A and two-stage first weights 132B, which are also attached to the work machine body 10 even when other lifting capacities are set. In this case, the detection unit 20 may be attached to a lower portion of the base weight 132A, the side surface or rear part of the base weight 132A or of the first weight 132B, or the like. Additionally, in the case of a configuration in which the first weight 132B is suspended below the base weight 132A, the detection unit 20 may be attached to a lower portion of the first weight 132B positioned in the lowermost stage.

According to such an attachment position of the detection unit 20, even when the work machine 1A is set to have any lifting capacity, the detection unit 20 is disposed at a constant position and angle, and thus constant monitoring processing can always be performed during work.

Moreover, as shown in FIGS. 7 and 8, the detection unit 20 is attached to a lower portion of the counterweight 132. Thus, a blind spot is less likely to occur behind the work machine 1A, and objects (workers or obstacles) located below the counterweight 132 can also be detected when the rotating platform 12 turns. In a case where the height of an object is low, when the rotating platform 12 turns, the object interferes with the counterweight 132 or the counterweight 132 passes above the object. Accordingly, a determination as to whether or not the object interferes with the counterweight 132 can be performed on the basis of the detection result of the detection unit 20.

Moreover, the detection unit 20 is disposed at a position overlapping the mast 123 when viewed from above. The position overlapping the mast 123 when viewed from above may be a position overlapping the strut 123*a* or the horizontal member 123*b* when the mast 123 is at any angle from a horizontal angle to a vertical angle. By virtue of such a disposition, a single detection unit 20 can detect a region that extends to the left and right. Moreover, even when the detection unit 20 is at a position overlapping the mast 123, since the detection unit 20 is attached to the lower portion of the counterweight 132, there is no risk of interference between the mast 123 and the detection unit 20.

Moreover, the detection unit 20 is disposed inside the turning radius RT of the rotating platform 12. According to such a disposition, the monitoring from the inside of the turning radius RT to the vicinity and outside of the turning radius RT is possible. Moreover, the detection range W1 of the detection unit 20 overlaps the counterweight 132 (for example, a rear end of a lower surface of the base weight 132A). According to such a disposition, the turning radius RT, that is, the rear end portion of the counterweight 132 can be directly detected when the rotating platform 12 turns, or the like, and whether or not there is an abnormality in the vicinity of the turning radius RT can be monitored with higher accuracy.

Moreover, a recessed portion U1 (see FIGS. 5A and 5B) is provided at the lower portion of the base weight 132A, and the detection unit 20 is attached such that at least a part thereof enters the recessed portion U1. In a case where the detection unit 20 is attached to the side surface or rear part of the base weight 132A or of the first weight 132B, recessed portions may be provided in these spots of the weights 132A and 132B, and part or all of the detection unit 20 may be accommodated in the recessed portions. According to such an attachment structure, interference of the detection unit 20 attached to the base weight 132A with other configurations or surrounding objects, or an increase in the turning radius can be suppressed.

As described above, according to the work machine 1A of Embodiment 2, even when the number of stages of the counterweight 132 is changed to switch the setting of the lifting capacity, the position of the detection unit 20 does not change. Thus, uniform monitoring processing can be realized.

The respective embodiments of the present invention have been described above. However, the present invention is not limited to the above embodiments. For example, in the above embodiments, a crawler crane has been shown as the mobile crane, but the movement method of the mobile crane according to the present invention is not limited, cranes adopting any movement methods, such as truck cranes or wheel cranes, may be used, and the type of cranes may be any cranes such as tower cranes. Additionally, in the above embodiments, a crawler crane has been shown as the work machine that is assembled or disassembled at a work site, but the work machine according to the present invention is not limited to a crane, and any work machines such as hydraulic excavators, may be used as long as the work machines are assembled and disassembled at the work site. Additionally, in the above embodiments, a scanning range finder and an imaging camera have been used as an example of the detection unit. However, the detection unit may have any configuration as long as the detection unit acquires data that enables the detection of surrounding objects. In addition, the details illustrated in the embodiments can be appropriately changed without departing from the scope of the invention.

The present invention is applicable to a work machine and a mobile crane.

It should be understood that the invention is not limited to the above-described embodiment, but may be modified into various forms on the basis of the spirit of the invention. Additionally, the modifications are included in the scope of the invention.

What is claimed is:

1. A mobile crane that is assembled or disassembled at a work site, the mobile crane comprising:

a crane body; and a counterweight that includes weights in a plurality of stages and that is attached to the crane body, wherein a setting is capable of being changed to any one of a plurality of lifting capacities by changing the number of stages of the weights attached to the crane body, the plurality of lifting capacities includes a first lifting capacity and a second lifting capacity that is a lower lifting capacity than the first lifting capacity, the mobile crane further comprises a detection unit that monitors surroundings attached to the counterweight, and the detection unit is attached to any one of the weights other than an uppermost stage of the weights attached when the second lifting capacity is set.

2. The mobile crane according to claim 1, wherein the counterweight includes a base weight that supports another weight, and the detection unit is attached to a lower portion of the base weight.

3. The mobile crane according to claim 1, wherein the detection unit is disposed below the counterweight.

4. The mobile crane according to claim 1, further comprising:

a mast, wherein the detection unit is disposed at a position being overlapped by the mast when viewed vertically from above.

5. The mobile crane according to claim 1, wherein the counterweight includes a recessed portion that accommodates the detection unit.

6. The mobile crane according to claim 1, wherein the detection unit is disposed inside a turning radius.

7. The mobile crane according to claim 1, wherein a part of the counterweight is included in a detection range of the detection unit.

8. The mobile crane according to claim 1, wherein the detection unit is disposed rearward of a frontmost portion of the counterweight.

9. The mobile crane according to claim 8, wherein the detection unit is disposed at a position overlapping the counterweight when viewed vertically from below.

10. The mobile crane according to claim 8, wherein the detection unit is disposed at a side part or a rear part of the counterweight.

* * * * *